Oct. 23, 1928.

W. A. TAYLOR

TIRE CONSTRUCTION

Filed June 8, 1927

1,688,671

Inventor
W. A. Taylor
By C. A. Snow & Co.
Attorneys.

Patented Oct. 23, 1928.

1,688,671

UNITED STATES PATENT OFFICE.

WILLIAM ALFRED TAYLOR, OF DETROIT, MICHIGAN.

TIRE CONSTRUCTION.

Application filed June 8, 1927. Serial No. 197,421.

The present invention has reference to pneumatic or cushion tire constructions, and aims to provide a novel form of tread embodying a plurality of detachable tread sections which may be discarded and replaced when worn beyond use.

Another object of the invention is to provide means for securing the tread sections in position in such a way as to insure against movement of the tread sections with respect to the tire.

A still further object of the invention is to provide tread sections which may be readily and easily positioned by persons unfamiliar with mechanics.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
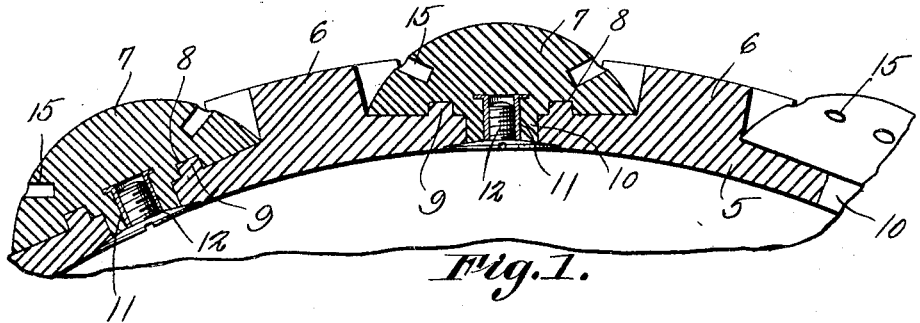
Figure 1 is a fragmental sectional view of a tread constructed in accordance with the invention.
Figure 2:
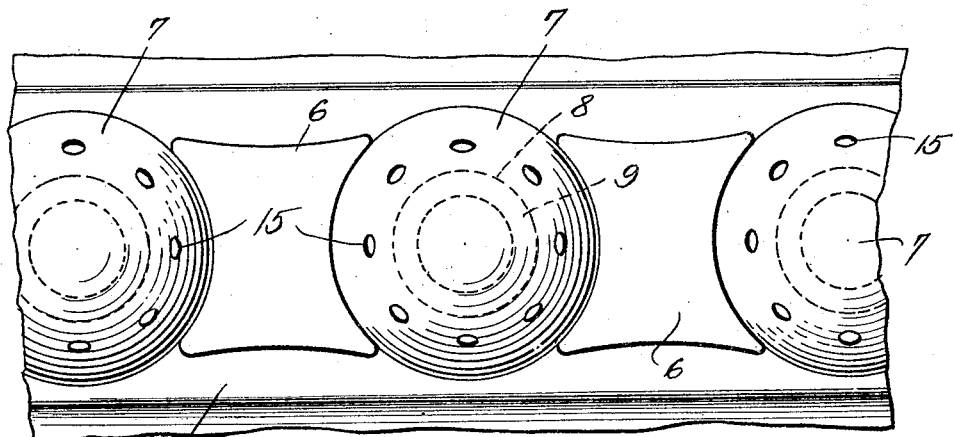
Figure 2 is a fragmental plan view of the tread of the tire.

Referring to the drawing in detail, the reference character 5 designates the tread proper which is provided with enlargements 6 arranged in spaced relation with each other, the inner edges of the enlargements being curved to conform to the curvature of the removable tread members 7.

These removable tread members are formed preferably of rubber and are mushroom-like in formation, the same being provided with grooves 8 to accommodate the circular rib 9 formed integral with the casing or tire tread.

The tire is also formed with openings to accommodate the extensions 10 of the removable tread members, which extensions are hollow and provided with metal linings 11 threaded to receive the threaded portions 12 of the securing screws, the heads of the securing screws being of a diameter to provide substantially wide bearing surfaces to contact with the under-surface of the tire tread as clearly shown by Figure 1.

Thus it will be seen that due to this construction, the securing screws may be readily and easily removed or replaced by persons unfamiliar with mechanics, to the end that the tread members may, when they become worn beyond use, be replaced.

Figures 3, 4:
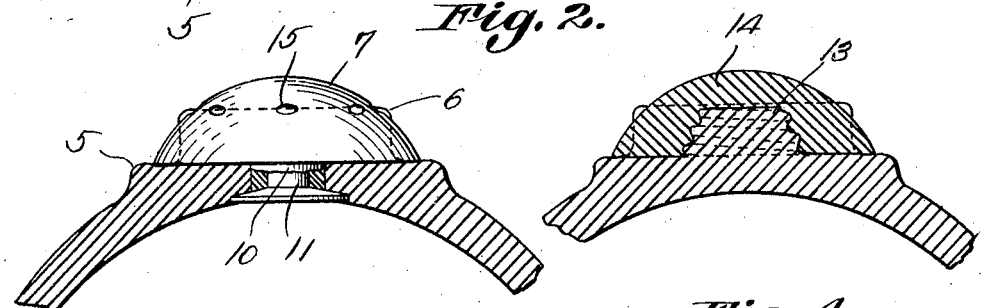
Figure 3 is a vertical sectional view through the tread.
Figure 4 is a vertical sectional view of a modified form of tread.

As shown by Figure 4, the tread is provided with frusto-conical enlargements 13 which are threaded to fit within the conical openings of the removable tread members 14, which tread members 14 are also dome-like in construction and adapted to be fitted between adjacent enlargements of the tire tread.

Openings 15 are provided in the removable tread members to lend resiliency to the tread member and at the same time insuring against the tread members splitting while in use.

It will further be seen that due to the construction set forth, the weight of the vehicle equipped with tires of the type illustrated, will cause the elements of the tire to be spread so that the tread sections will be securely held in position by the ribs and grooves.

I claim:

1. A tire tread embodying a body portion formed with recesses, the recesses having curved side walls, tread sections positioned within the recesses, securing members extending through the body portion and into the tread sections to secure the tread sections into position, and means adjacent to the securing members for holding the tread sections against lateral movement 2. A tire tread embodying a body portion, said body portion having recesses formed therein and having openings extending therethrough, centrally of the recesses, tread sections having hollow extensions extended through the openings, securing members extending into the openings for holding the tread sections in position.

In testimony that I claim the foregoing as my own, I have hereto affixed my signature.

WILLIAM ALFRED TAYLOR.